(12) United States Patent
Gupta et al.

(10) Patent No.: US 9,542,712 B2
(45) Date of Patent: Jan. 10, 2017

(54) METHOD AND APPARATUS TO CALCULATE REAL-TIME CUSTOMER SATISFACTION AND LOYALTY METRIC USING SOCIAL MEDIA ANALYTICS

(71) Applicant: Dell Products L.P., Round Rock, TX (US)

(72) Inventors: Munish Gupta, Austin, TX (US); Shree A. Dandekar, Cedar Park, TX (US); Dongxia Chen, Round Rock, TX (US); Keisha Daruvalla, Austin, TX (US); Brian Melinat, Austin, TX (US); Guhan Palaniandavan, T. Naga (IN)

(73) Assignee: DELL PRODUCTS L.P., Round Rock, TX (US)

( * ) Notice: Subject to any disclaimer, the term of this patent is extended or adjusted under 35 U.S.C. 154(b) by 257 days.

(21) Appl. No.: 14/221,377

(22) Filed: Mar. 21, 2014

(65) Prior Publication Data

US 2014/0207562 A1 Jul. 24, 2014

Related U.S. Application Data

(63) Continuation-in-part of application No. 13/683,551, filed on Nov. 21, 2012, which is a continuation-in-part of application No. 13/027,607, filed on Feb. 15, 2011.

(51) Int. Cl.
*G06Q 50/00* (2012.01)
*G06Q 30/02* (2012.01)

(52) U.S. Cl.
CPC .......... *G06Q 50/01* (2013.01); *G06Q 30/0242* (2013.01)

(58) Field of Classification Search
CPC ........................... G06Q 30/0242; G06Q 50/01
See application file for complete search history.

(56) References Cited

U.S. PATENT DOCUMENTS

| | | | |
|---|---|---|---|
| 2007/0214097 A1* | 9/2007 | Parsons | G06F 17/30864 706/12 |
| 2007/0226248 A1* | 9/2007 | Darr | G06Q 10/10 |
| 2008/0010319 A1* | 1/2008 | Vonarburg | G06F 17/30861 |
| 2008/0243628 A1* | 10/2008 | Wiseman | G06Q 30/04 705/26.1 |
| 2009/0119173 A1* | 5/2009 | Parsons | G06Q 10/107 705/319 |
| 2010/0119053 A1* | 5/2010 | Goeldi | G06Q 10/00 379/265.09 |

(Continued)

*Primary Examiner* — Michael C Lai
(74) *Attorney, Agent, or Firm* — Terrile, Cannatti, Chambers & Holland, LLP; Stephen A. Terrile

(57) ABSTRACT

A method and system are disclosed for providing a near-real-time measurement of sentiment and advocacy associated with user interactions within a social media environment. A first and second set of social media data, respectively associated with a first and second set of social media interactions, are processed to generate a first and second set of social network advocacy (SNA) data in near-real-time. The resulting first and second sets of SNA data are then processed to generate a first and second set of SNA Pulse (SNAP) metric data, which respectively indicate a near-real-time measurement of sentiment and advocacy for a given aspect of an organization. The first and second sets of SNAP metric data are then processed to generate a set of SNAP metrics differential data, which indicates a corresponding improvement or decline in sentiment or advocacy.

1 Claim, 12 Drawing Sheets

(56) References Cited

U.S. PATENT DOCUMENTS

| | | | |
|---|---|---|---|
| 2010/0121849 A1* | 5/2010 | Goeldi | G06Q 10/00 707/736 |
| 2010/0325107 A1* | 12/2010 | Kenton | G06Q 30/00 707/723 |
| 2011/0047229 A1* | 2/2011 | Sinha | G06F 9/543 709/206 |
| 2011/0246483 A1* | 10/2011 | Darr | G06Q 10/10 707/748 |
| 2012/0036200 A1* | 2/2012 | Cole | H04L 51/32 709/206 |
| 2012/0036454 A1* | 2/2012 | Cole | G06Q 10/103 715/752 |
| 2012/0047219 A1* | 2/2012 | Feng | G06F 17/3071 709/207 |
| 2012/0209918 A1* | 8/2012 | Shah | G06Q 30/0251 709/205 |
| 2012/0209919 A1* | 8/2012 | Shah | G06Q 30/0251 709/205 |
| 2012/0209986 A1* | 8/2012 | Shah | G06Q 50/01 709/224 |
| 2013/0173612 A1* | 7/2013 | Shah | G06F 17/3053 707/731 |
| 2014/0149422 A1* | 5/2014 | Sadler | G06Q 50/01 707/741 |
| 2014/0180788 A1* | 6/2014 | George | G06Q 30/0269 705/14.41 |
| 2014/0207560 A1* | 7/2014 | Dandekar | G06Q 30/0242 705/14.41 |
| 2015/0025977 A1* | 1/2015 | Doyle | G06Q 50/01 705/14.66 |

* cited by examiner

METHOD AND APPARATUS TO CALCULATE REAL-TIME CUSTOMER SATISFACTION AND LOYALTY METRIC USING SOCIAL MEDIA ANALYTICS

CONTINUING DATA

This application is a continuation-in-part of U.S. patent application Ser. No. 13/683,551, filed Nov. 21, 2011, entitled "Social Net Advocacy for Providing Categorical Analysis of User Generated Content" by inventors Shesha Shah, Rajiv Narang and Munish Gupta, which is a continuation-in-part of U.S. patent application Ser. No. 13/027,607, filed Feb. 5, 2011, entitled "Social Net Advocacy Process and Architecture" by inventors Shesha Shah and Rajiv Narang, both of which are incorporated by reference in their entireties.

CROSS REFERENCE TO RELATED APPLICATIONS

U.S. patent application Ser. No. 14/221,371, filed Mar. 21, 2014, entitled "Method And Apparatus To Derive Product-Level Competitive Insights In Real-Time Using Social Media Analytics" by inventors Shree A. Dandekar, Munish Gupta, and Keisha Daruvalla, which is incorporated by reference in its entirety.

U.S. patent application Ser. No. 14/221,374, filed Mar. 21, 2014, entitled "Method And Apparatus To Create A Mash-Up Of Social Media Data And Business Data To Derive Actionable Insights For The Business" by inventors Shree A. Dandekar and Munish Gupta, which is incorporated by reference in its entirety.

U.S. patent application Ser. No. 14/221,381, filed Mar. 21, 2014, entitled "Method And Apparatus To Calculate Social Pricing Index To Determine Product Pricing In Real-Time" by inventors Shree A. Dandekar and Munish Gupta, which is incorporated by reference in its entirety.

U.S. patent application Ser. No. 13/027,607, filed on Feb. 15, 2011, entitled "Social Net Advocacy Process and Architecture" by inventors Shesha Shah and Rajiv Narang, which is incorporated by reference in its entirety.

U.S. patent application Ser. No. 13/027,651, filed Feb. 15, 2011, entitled "Social Net Advocacy Business Applications" by inventors Shesha Shah and Rajiv Narang, describes is incorporated by reference in its entirety.

U.S. patent application Ser. No. 13/027,682, filed Feb. 15, 2011, entitled "Social Net Advocacy Measure" by inventors Shesha Shah and Rajiv Narang, which is incorporated by reference in its entirety.

U.S. patent application Ser. No. 13/027,738, filed Feb. 15, 2011, entitled "Social Net Advocacy Contextual Text Analytics" by inventors Shesha Shah and Rajiv Narang, which is incorporated by reference in its entirety.

BACKGROUND OF THE INVENTION

Field of the Invention

Embodiments of the invention relate generally to information handling systems. More specifically, embodiments of the invention provide a method and system for a method and system is disclosed for providing a near-real-time measurement of sentiment and advocacy associated with user interactions within a social media environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have been just as instrumental in the rapid adoption of social media into the mainstream of everyday life. Social media commonly refers to the use of web-based technologies for the creation and exchange of user-generated content for social interaction. As such, it currently accounts for approximately 22% of all time spent on the Internet. More recently, various aspects of social media have become an increasingly popular for enabling customer feedback, and by extension, they have likewise evolved into a viable marketing channel for vendors. This new marketing channel, sometimes referred to as "social marketing," has proven to not only have a higher customer retention rate than traditional marketing channels, but to also provide higher demand generation "lift."

Traditional methods of measuring the effectiveness of a social media channel include Social Media Analytics (SMA), determining a Net Promoter Score (NPS), and likewise determining a Brand Health Score (BHS). NPS is a customer loyalty metric intended to reduce the complexity of implementation and analysis frequently associated with measures of customer satisfaction with the objective of creating more "Promoters" and fewer "Detractors." As such, a Net Promoter Score is intended to provide a stable measure of business performance that can be compared across business units and even across industries while increasing interpretability of changes in customer satisfaction trends over time. Currently, several approaches are known for defining, calculating and monitoring a Brand Health Score. In general, these approaches typically include the generation of a score card that comprises a mix of leading and lagging indicators of the health of a brand, whether individually or as part of a brand portfolio.

Such scores assist executives in understanding the return on investment (ROI) of their marketing investments, and by extension, the value of long-term versus short-term investments. However, neither of these approaches provides social media channel feedback in real-time, nor do they provide actionable information at a granular level, such as by industry segment, product line, or a topic of discussion. As a result, marketers are unable to proactively react to changes in consumer sentiment in a categorical context, which can adversely affect revenue and profits.

SUMMARY OF THE INVENTION

A method and system are disclosed for providing a near-real-time measurement of sentiment and advocacy associated with user interactions within a social media environment. In various embodiments, a first set of social media data is processed to generate a first set of social network advocacy (SNA) data in near-real-time. The resulting first set of SNA data is then processed to generate a first set of SNA Pulse (SNAP) metric, which indicates a near-real-time measurement of sentiment and advocacy for a given aspect of an organization.

In certain embodiments, a second set of social media data is processed to generate a second set of social network advocacy (SNA) data, likewise in near-real-time. The resulting second set of SNA data is then processed to generate a second set of SNAP metric data. In these embodiments, the first and second sets of SNA data are respectively associated with a first and second set of user interactions within a social media environment. In various embodiments, the first and second sets of SNAP metric data are processed to generate a set of SNAP metrics differential data, which indicates a corresponding improvement or decline in sentiment or advocacy.

In various embodiments, the first and second sets of social media data are respectively processed with a first and second set of related data to generate the first and second sets of SNA data. In these embodiments, the first and second sets of related data may include, loyalty survey data, technical support call log data, social media profile data, of customer relationship management (CRM) data. In various embodiments, the first and second sets of SNA data may include a numeric value associated with sentiment, gravity, domain influence, reach or relevance. In these embodiments, the first and second SNAP metrics are respectively generated by processing the numeric values corresponding to sentiment, gravity, domain influence, reach or relevance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and system is disclosed for providing a near-real-time measurement of sentiment and advocacy associated with user interactions within a social media environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
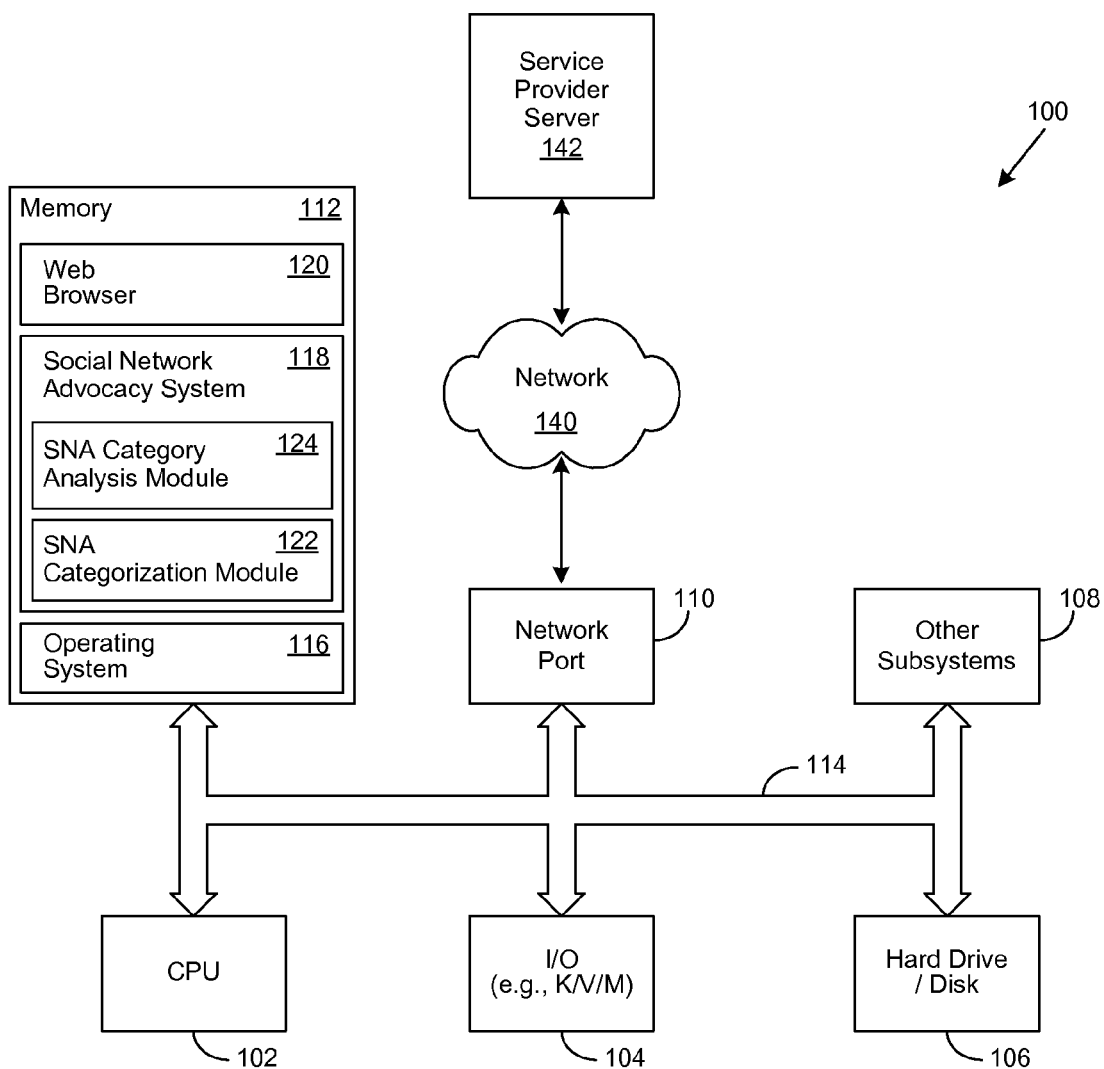
FIG. 1 is a general illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and a Web browser 126. In various embodiments, the system memory 112 may also comprise a social network advocacy (SNA) system 118. In certain of these embodiments, the SNA system 118 comprises an SNA categorization module 122 and an SNA category analysis module 124. In one embodiment, the information handling system 100 is able to download the Web browser 126 and the social network advocacy system 118 from the service provider server 142. In another embodiment, the social network advocacy system is provided as a service from the service provider server 142.

Figure 2:
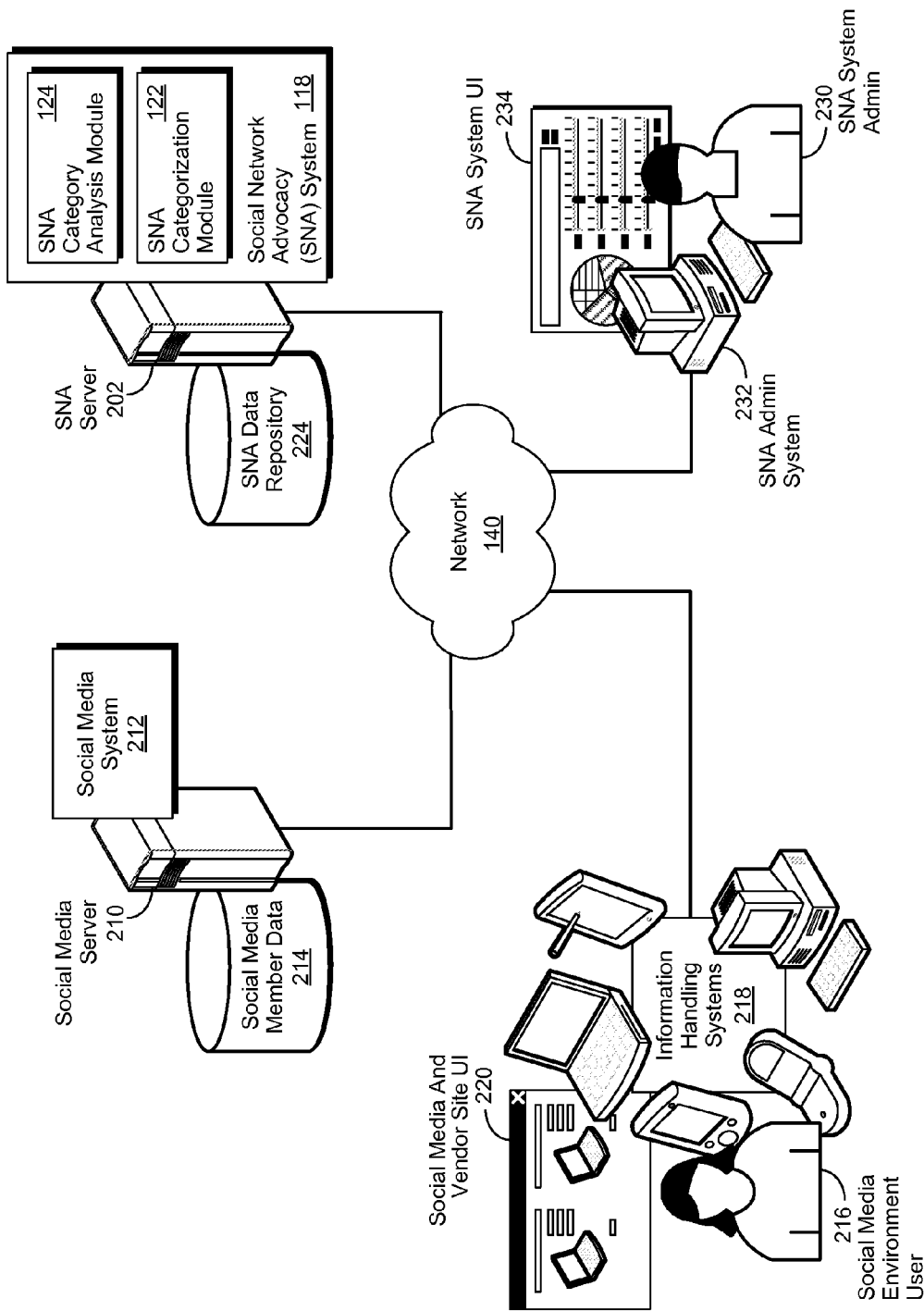
FIG. 2 is a simplified block diagram showing an implementation of a social network advocacy (SNA) system.

FIG. 2 is a simplified block diagram showing an implementation of a social network advocacy (SNA) system in accordance with an embodiment of the invention. As used herein, social net advocacy (SNA) refers to a metric that provides a measure of the effect on the health of a business as a result of user interactions conducted within a social media environment. More specifically, it measures the net influence resulting from the user interactions generated by ravers, who generate positive interactions, and ranters, who generate negative interactions, within one or more social media environment. As such, it provides a correlation to a vendor's, or a vendor's product's, Net Promoter Score (NPS) and Brand Health scores on a near-real-time basis and provides a single, actionable metric to track. By combining the monitoring of user interactions (e.g., a conversation, as described in greater detail herein) with customer profiling data, it likewise provides immediate measurement of the effects of marketing, support, and public relation actions viewed at the enterprise, business unit, market segment, product, sub-brand and geographical levels. As a result, the trending of key performance indicators (KPIs) are supported, which provides more than a simple "pulse measurement" for a given point of time in the market. More specifically, social media interaction data is collected, and then processed in various embodiments to measure the affect of various social media user interactions while providing a vendor actionable data by gaining insight to the source and location of the interactions.

In various embodiments, an algorithm is implemented with the SNA system to integrate the contextual influence of user behavior within a social media environment with transactional data, such as purchase of a vendor's product, to generate near-real-time feedback to pro-active marketing responses. As a result, the SNA system provides vendors answers to question such as what was the initial reaction to the product prior to general availability, and how did social media user interactions change after the product was released? It will be appreciated that other marketing-related questions can be answered, such as how the initial marketing efforts were received, especially for an online demand generator (ODG), and who were the primary promoters that drove positive social media conversations and responses. Likewise, the question of what were influencers saying about a product or one of its features can not only be answered, but also with a metric showing the quantifiable affect of their user interactions. Those of skill in the art will recognize that statistically significant changes in net advocacy represent opportunities for changes in pricing, brand health change, and other aspects related to the health of a business.

In various embodiments, an SNA system 118 is implemented to monitor user interactions and generate proactive marketing responses within a social media environment. In certain of these embodiments, the SNA system 118 comprises an SNA categorization module 122 and an SNA category analysis module 124. In these and other embodiments, a social media environment user 216 uses an information handling system 218 to log on to a social media environment, or site, enabled by a social media system 212, which is implemented on a social media server 210. As used herein, an information handling system 218 may comprise a personal computer, a laptop computer, or a tablet computer operable to exchange data between the social media environment user 216 and the social media server 210 over a connection to network 140. The information handling system 218 may also comprise a personal digital assistant (PDA), a mobile telephone, or any other suitable device operable to display a social media and vendor site user interface (UI) 220 and likewise operable to establish a connection with network 140. In various embodiments, the information handling system 218 is likewise operable to establish an on-line session over network 140 with the SNA system, which is implemented on an SNA server 202.

In this embodiment, SNA operations are performed by the SNA system 118 to monitor social media interactions related to a target subject, such as vendor's product. In one embodiment, the social media interactions are monitored and collected by a social media crawler operable to perform crawling operations in a target social media environment. The collected social media interactions are then stored in the SNA data repository 224. If it is determined that an increase in social media traffic related to the target subject is detected, then the social media traffic related to the target subject is processed to determine whether the subject traffic is positive or negative. If it is determined that the subject traffic is negative, then it is processed by the SNA system 118 to prioritize the most negative interactions. The source(s) (e.g., social media environment user 216) of the most negative interactions are identified and they are then displayed in an SNA system user interface (UI) 234 implemented on an SNA administrator system 232. Once displayed, the sources are reviewed by an SNA system administrator 230 to determine the issues causing the negative interactions. Once the issues have been determined, proactive actions are performed by the SNA system administrator 230, or a designated SNA system agent, to address the identified issue(s). Thereafter, the primary source(s) of the subject traffic is contacted by the SNA system administrator 230, or a designated SNA system agent, to gain a better understanding of the issues causing the negative interactions. Additional proactive actions are then performed by the by the SNA system administrator 230, or a designated SNA system agent, while tracking the results of the proactive actions and the relationship with the primary source(s) of the subject traffic.

Figure 3:
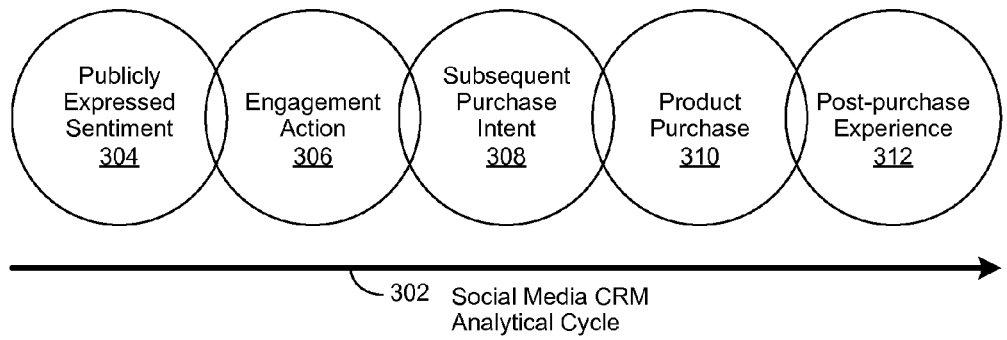
FIG. 3 is a simplified block diagram showing a social media customer relationship management (CRM) analytical cycle.

FIG. 3 is a simplified block diagram showing a social media customer relationship management (CRM) analytical cycle as implemented in accordance with an embodiment of the invention. In this embodiment, a social media CRM analytical cycle 302 comprises a publicly-expressed sentiment phase 304, an engagement action phase 306, a subsequent purchase intent 308 phase, a product purchase phase 310, and a post-purchase experience phase 312. As shown in FIG. 3, the associated action of a social media participant within each of the phases 306, 308, 310 and 312, from a CRM analysis standpoint, is dependent upon the effect of its predecessor phases.

As an example, a social media participant may read a highly-complimentary review of a product he or she may be considering purchasing during the publicly-expressed sentiment phase 304. As a result of that social media interaction, the social media participant may perform additional product research during the engagement action phase 306. Likewise, if additional product research is positive, such as user reviews of the product, then the social media participant may proceed to the vendor's web site in the subsequent purchase intent phase 308 to obtain additional information about the product. Assuming that the additional product information is appealing, and the social media participant has the means to execute a purchase, then he or she may purchase the product purchase phase 310. Likewise, once the product is received, and if the purchaser is happy with the product, then he or she may write a complimentary review for of the product during the post-purchase experience phase 312 for posting on a social media site.

From the foregoing, it will be apparent to those of skill in the art that a potential purchaser of a product may be either encouraged or dissuaded from purchasing the product based on pro or con sentiments about the product expressed by other members within a social media community. Accordingly, the ability to emphasize (e.g., "showcase") positive comments, or mitigate the effects of negative comments, may have a direct and measurable effect on sales of a product.

Figure 4:
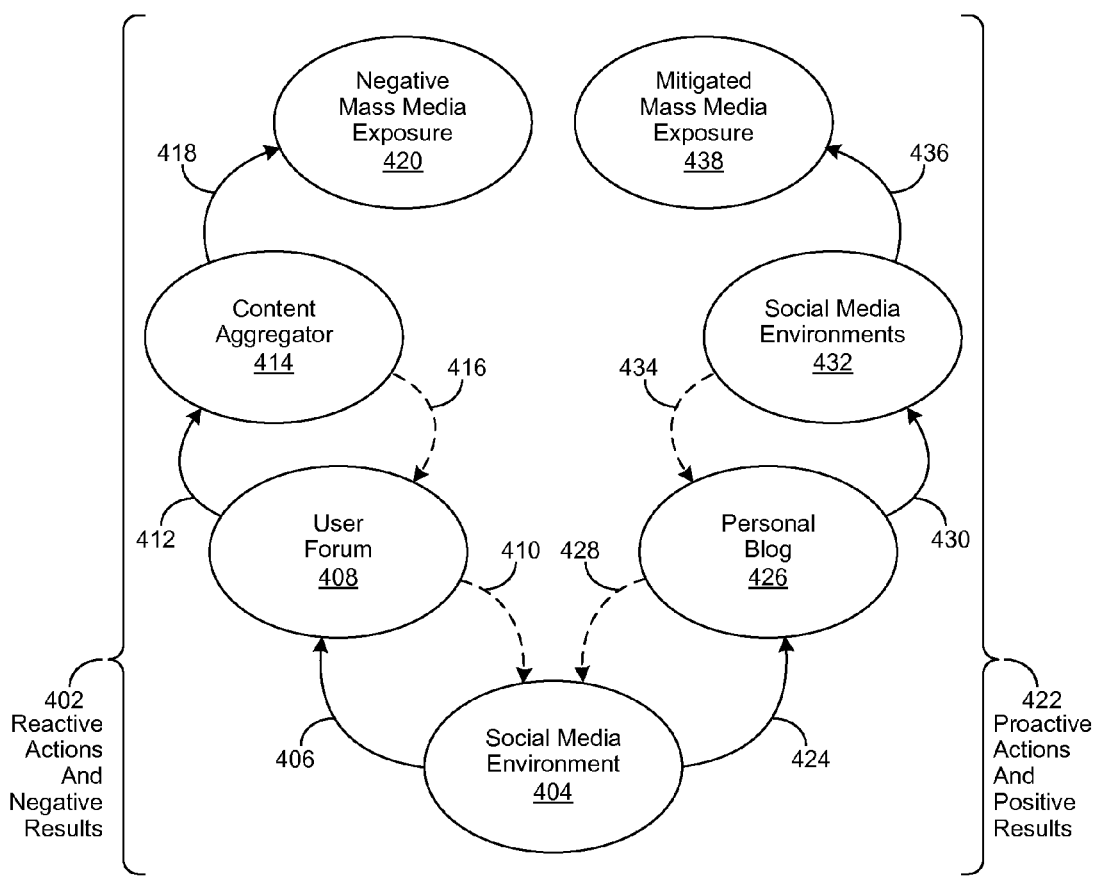
FIG. 4 is a simplified block diagram showing the effect on social media feedback channels as a result of implementing an SNA system.

FIG. 4 is a simplified block diagram showing the effect on social media feedback channels as a result of implementing a social networking advocacy (SNA) system in accordance with an embodiment of the invention. In this embodiment, one or more "conversations" are conducted between two or more users of a social media environment. As used herein, a "conversation" refers to an interaction within a social media environment between two or more users of the social media environment. As an example, a conversation may comprise a posting by an author of a blog, which in turn is read by one or more readers. As another example, a user may post a comment within a user forum, which in turn is read by one or more users, and in turn may or may not elicit a response from the one or more users. As yet another example, one user of a social media environment may ask a question of another user, which may or may not receive a response from the other user.

More specifically, a conversation is defined as a set of comments in a thread of user interactions within a social media environment. Each conversation has an author and a topic assigned to it, referenced to a predetermined ontology. In different embodiments, a conversation may originate from within a volume of user interactions, which in turn occur within one or more social media environments. Over time, the conversation may grow as additional users perform additional interactions, which are linked to the thread or related threads. In various embodiments, a conversation is defined as:

Conversation_j = { Author_j, Context_j, Thread_j, Relevance_j, Date _j } _j
where:
Context_J = { (URL_j, Topic_j, Ontology_Node_j) }
Relevance_J = { (SearchEngine_rank_j, Campaign_j) }
Thread_j = { (Comment_ji, Author_ji) _ji }_i
Author_i = { UserID_i, CommunityID_i }
Comment_ji = { "Text"_ij, Date_ij }
CommunityID_i = { UserID_i, (DomainID_k, NetworkID_ik) _k } where each networkID_ik has pairs of UserIDs and the weightage of the link is for the pair. It will be apparent to those of skill in the art that many such embodiments are possible and the foregoing is not intended to limit the spirit, scope, or intent of the invention.

In this embodiment, users of a social media environment 404 conduct conversations as described in greater detail herein. Without the implementation of an SNA system, reactive actions 402 are performed resulting in negative results, whereas with the implementation of an SNA system, proactive actions 422 are performed resulting in positive results. As an example, without the implementation of a SNA system, a user may post 406 a negative comment about a vendor's product in a user forum 408. In response, additional users may respond 410 with their own postings, either requesting additional details or perhaps adding negative comments of their own. Likewise, the negative comments may be collected 412 by a content collector 414 familiar to those of skill in the art. In turn, the collected negative comments, and their web address, may be referenced 416 by another posting by a user in the user forum 408. The collected negative comments may also be sourced 418 by various media agencies resulting in negative mass media exposure 420.

In contrast, with the implementation of an SNA system, a user may post 424 a negative comment about a vendor's product in a personal blog 426. In response, readers of the personal blog 426 may respond 428 with requests for additional details or perhaps adding negative comments of their own. However, since the personal blog 426 is monitored by an SNA system operated by the vendor, then such issues, questions, and negative comments are captured as they are posted and the vendor is notified so they can act proactively. As an example, a representative of the vendor may request additional information about the product issue with a promise to research a solution and provide it to the author of the personal blog. Likewise, the author of the personal blog may broadcast or otherwise provide 430 their posting, directly or indirectly, to one or more additional social media environments 432. In response, users of those additional social media environments 432 may respond 434 with their own questions, responses, or negative comments. However, since the additional social media environments 432 are likewise monitored by an SNA system operated by the vendor, the vendor can act proactively in a like manner as previously described. Through the monitoring and collection 436 of the negative responses, and the resulting proactive activities performed by the vendor, the possibility of negative mass media exposure is mitigated 438.

Figure 5:
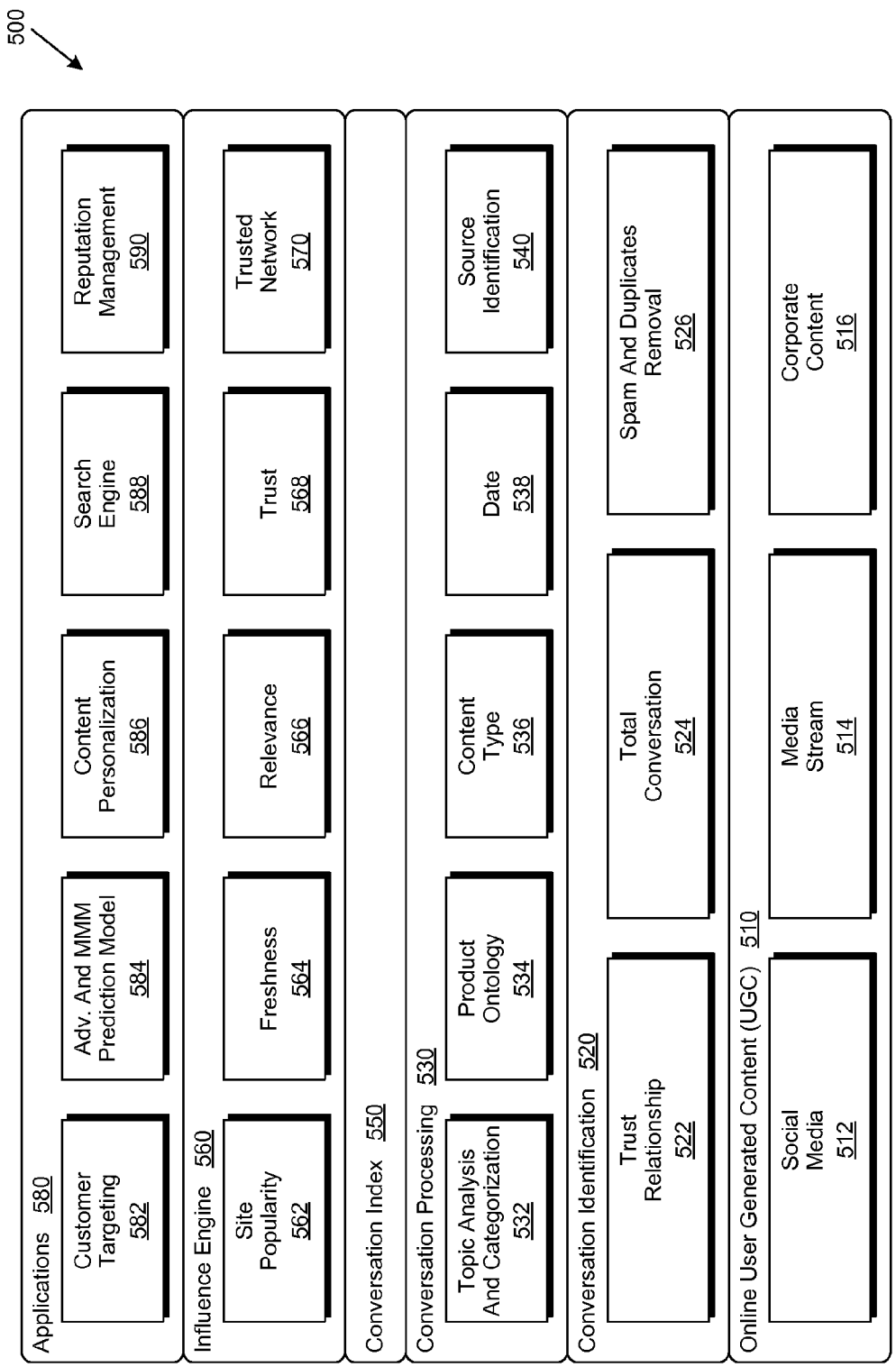
FIG. 5 is a simplified block diagram of the architecture of an SNA system.

FIG. 5 is a simplified block diagram of the architecture of a social network advocacy (SNA) system as implemented in accordance with an embodiment of the invention. In this embodiment, the architecture of the SNA system 500 comprise online user-generated content 510, a conversation identification subsystem 520, a conversation processing subsystem 530, a conversation index 550, an influence engine 560, and applications 580. As shown in FIG. 5, the online user-generated content 510 comprises content that is generated by users of one or more social media 512 environments. The online user-generated content 510 likewise comprises content that is generated by media agencies and provided in a media stream 514, such as news feeds, and corporate content 516, such as content published by a vendor on their web site.

As likewise shown in FIG. 5, the conversation identification subsystem 520 comprises a trust relationship module 522, a total conversation module 524, and a spam and duplicates removal module 526. The spam and duplicates removal module 526 is used to remove spam and duplicate conversations or elements of conversations. The conversation processing subsystem 530 comprises a topic analysis and categorization module 532, a product ontology module 534, a content type module 536, a date module 532 to assign a date to a conversation, and a source identification module 540 for determining the source of a conversation. In one embodiment, the product ontology module 534 is implemented to manage the interrelationship of a vendor's products and their associated information. In another embodiment, the product ontology module 534 is implemented to manage the interrelationship of conversation topics and their corresponding categorizations, the content type and source of a conversation, and the date of the conversation as it relates to a vendor's product. In yet another embodiment, the product ontology module 534 is implemented manually. In still another embodiment, the product ontology module 534 is implemented automatically by the SNA system. In one embodiment the source identification module 540 identifies the author(s) of a conversation. In another embodiment, the source identification module 540 uses an "authority rating" as a factor to increase or decrease the relative influence rating of a conversation author. As an example, the managing editor of a trade publication may have a higher authority rating than a first-time poster to a technical help forum. As a result, the relative influence rating of the managing editor would be increased while the relative influence rating of the first-time poster would be decreased. The conversation index 550 is implemented in one embodiment to maintain an index of conversations and related information, such as the interrelationship information managed by the product ontology module 534.

As shown in FIG. 5, the influence engine subsystem 560 comprises a site popularity module 562 that determines the popularity of a social media environment or sub-environment, and a freshness module 564 that determines how recent a conversation took place. In one embodiment, the freshness module 564 determines the velocity, or how quickly, comments are added to a conversation by users of a social media environment. The influence engine subsystem 560 likewise comprises a relevance module 566 used to determine the relevance of a conversation to a vendor or their product(s) and a trust module 568 used to determine the trustworthiness of the source and content of the conversation. The influence engine subsystem 560 likewise comprises a trusted network module 570 used to capture conversations that occur on known and relevant sources.

The applications subsystem 580, as shown in FIG. 5, comprises a customer targeting module 582 used to target one or more customer and advertising and marketing mix modeling (MMM) prediction module 584. The applications subsystem 580 likewise comprises a content personalization module 586 for customizing content provided to a conversation, a search engine 588, and a reputation management module 590. In one embodiment, the reputation management module 590 is used to manage reputation data associated with a user of a social media environment. As used herein, reputation data refers to data associated with social commerce activities performed by a user of a social media environment and reflects customer loyalty.

Figure 6:
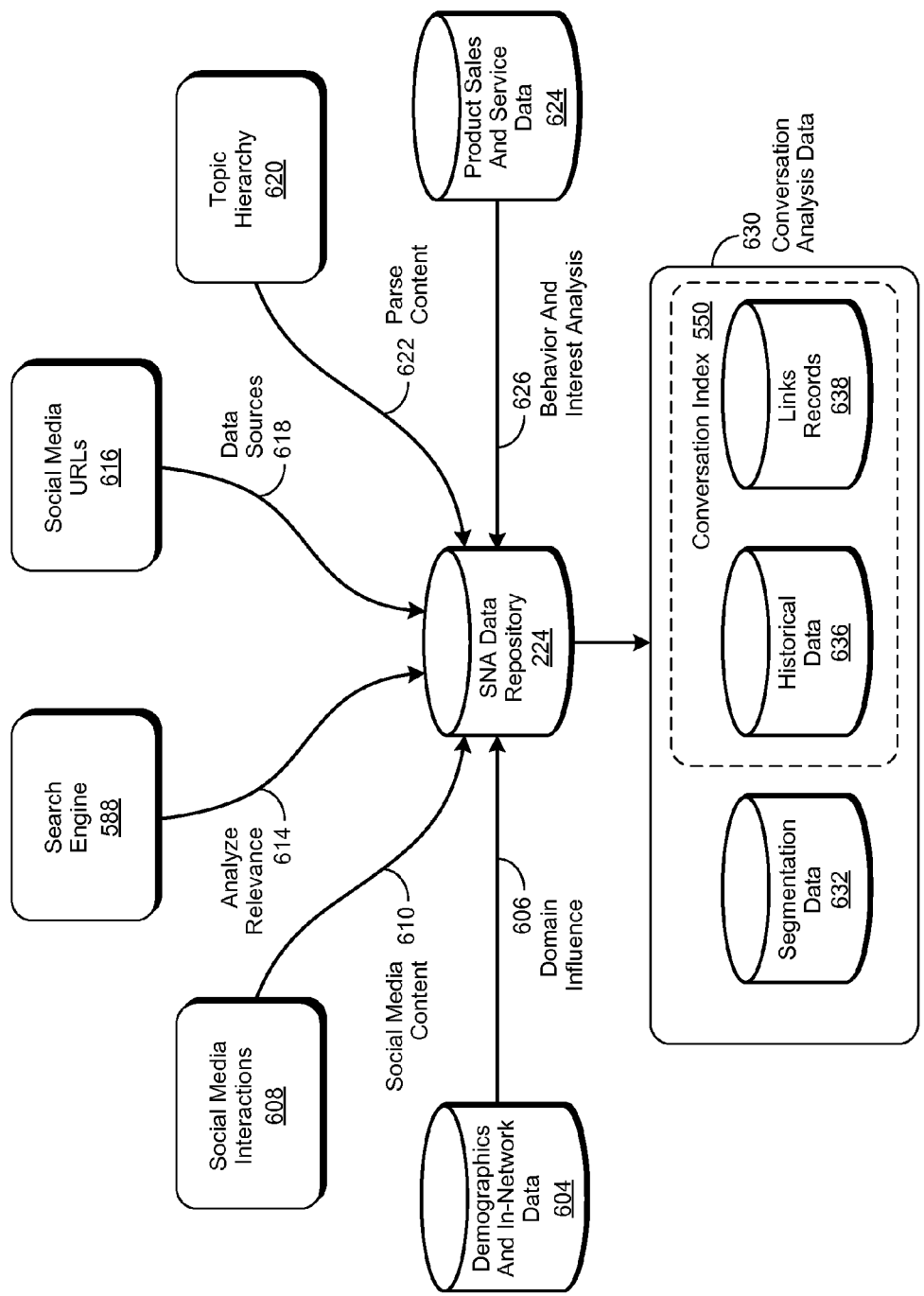
FIG. 6 is a simplified block diagram showing the aggregation and processing of social network advocacy (SNA) data to generate social media conversation analysis data.

FIG. 6 is a simplified block diagram showing the aggregation and processing of social network advocacy (SNA) data in accordance with an embodiment of the invention to generate social media conversation analysis data. In this embodiment, an SNA data repository 224 comprises data provided by a demographics and in-network data repository 604, which is used to determine domain influence 606. As used herein, domain influence refers to relevance of a domain on topics and concepts related to conversation. The SNA data repository 224 likewise comprises data provided by a product sales and service data repository 624, which is used to perform behavior and interest analysis 626 of users of a social media environment. Likewise, the SNA data repository 224 receives data feeds resulting from social media interactions 608, which comprises social media content 610, and data feeds from a search engine 588, which are used for analyzing relevance 614 as it relates to SNA data. The SNA data repository 224 likewise receives social media Uniform Resource Locators (URLs) 616 as data feeds, which provide the location of the various data sources 618, and references a topic hierarchy 620, which is used to parse content 622.

Figure 8:
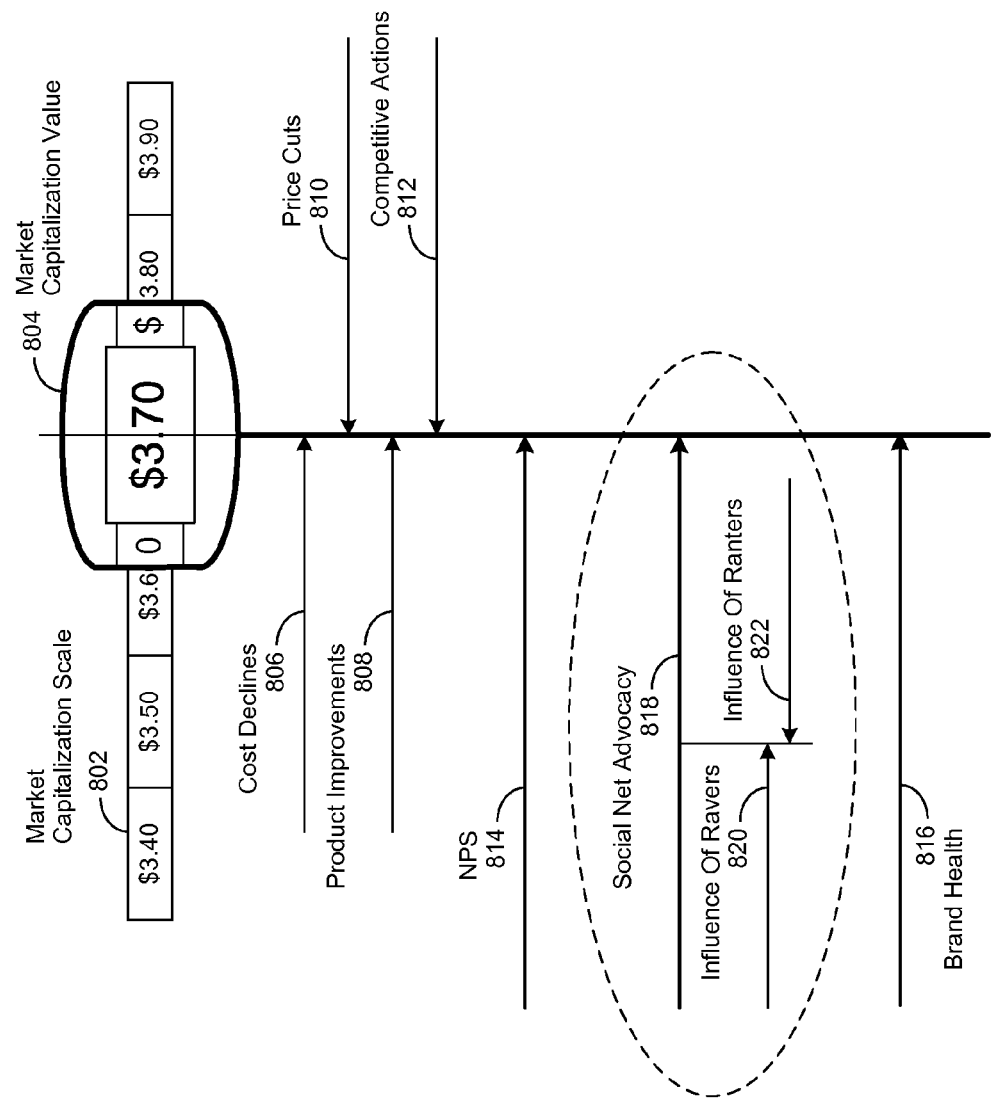
FIG. 8 is a generalized depiction of the effect of an implementation of an SNA system on market capitalization value.

In this and other embodiments, data processing operations familiar to those of skill in the art are performed on data extracted from the SNA data repository 224 to generate conversation analysis data 630. As shown in FIG. 8, the conversation analysis data 630 comprises segmentation data 632 and a conversation index 550, which further comprises a repository of historical data 636 and a repository of links records 638. In one embodiment, the repository of segmentation data 632 is used to map users of a social media environment to a vendor's customers. In another embodiment, the repository of segmentation data 632 is used to further segment mapped users of a social media environment to various segments of a vendor's installed base or product lines. It will be apparent to skilled practitioners of the art that many such segmentation examples are possible and the foregoing is not intended to limit the spirit, scope or intent of the invention. In one embodiment, the repository of historical data 636 comprises historical conversations conducted in a social media environment, which are in turn cross-referenced to linking information, such as conversation thread identifiers, stored in the repository of links records 638.

Figure 7:
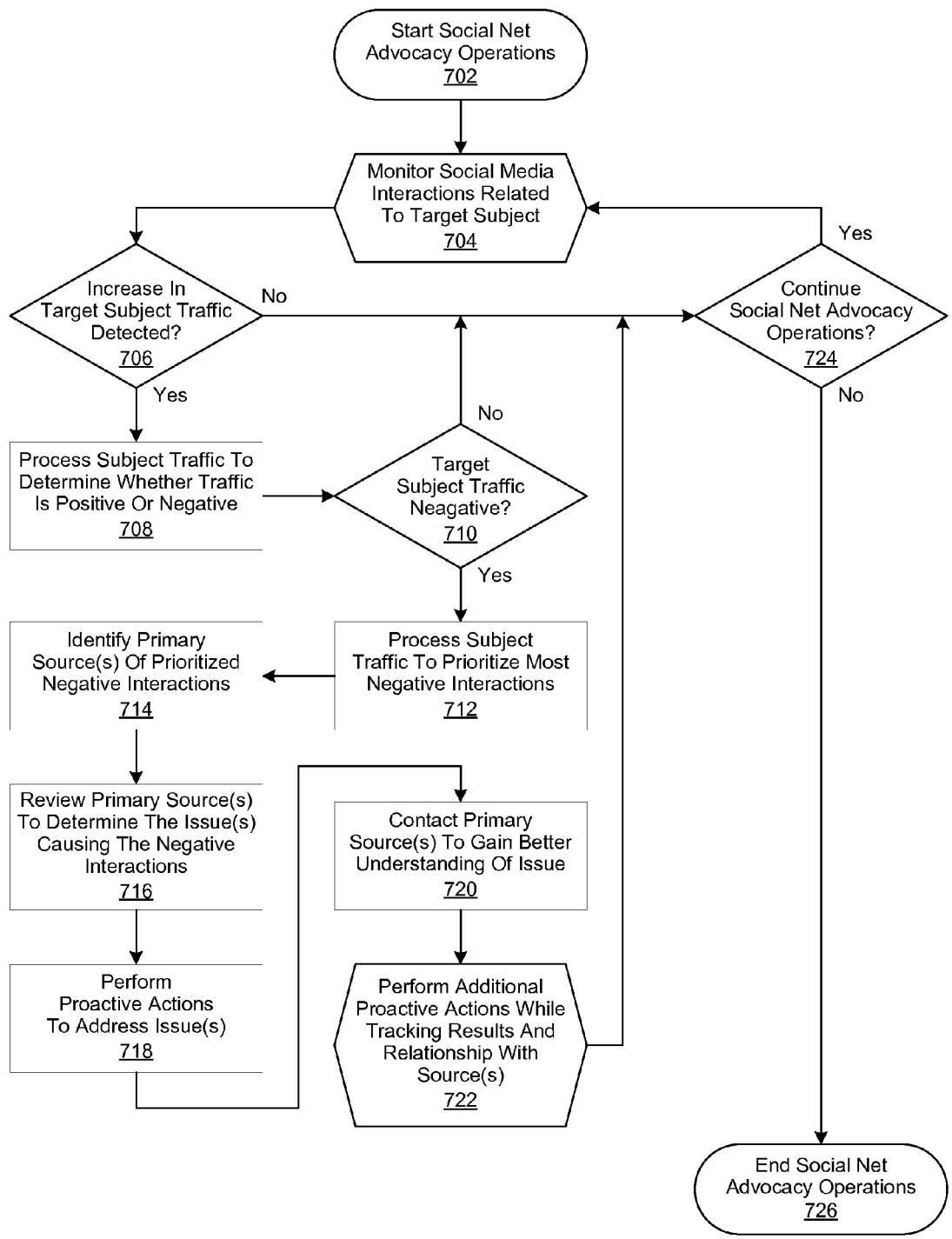
FIG. 7 is a generalized flow chart of the operation of an SNA system.

FIG. 7 is a generalized flow chart of the operation of a social network advocacy (SNA) system as implemented in accordance with an embodiment of the invention. In this embodiment, SNA operations are begun in step 702, followed by the monitoring of social media interactions related to a target subject in step 704. In one embodiment, the social media interactions are monitored and collected by a social media crawler operable to perform crawling operations in a target social media environment. A determination is then made in step 706 whether an increase in social media traffic related to the target subject is detected. If not, then a determination is made in step 724 whether to continue SNA operations. If so, then the process is continued, proceeding with step 704. Otherwise, SNA operations are ended in step 726.

However, if it is determined in step 706 that an increase in social media traffic related to the target subject is detected, then the social media traffic related to the target subject is processed to determine whether the subject traffic is positive or negative. A determination is then made in step 710 whether the subject traffic is negative. If not, then the process is continued, proceeding with step 724. Otherwise, the subject traffic is processed in step 712 to prioritize the most negative interactions. The source(s) of the most negative interactions are then identified in step 714 and they are then reviewed in step 716 to determine the issues causing the negative interactions. Once the issues have been determined, proactive actions are performed in step 718 to address the identified issue(s). Thereafter, the primary source(s) of the subject traffic is contacted in 720 to gain a better understanding of the issues causing the negative interactions. Additional proactive actions are then performed in step 722 while tracking the results of the proactive actions and the relationship with the primary source(s) of the subject traffic. The process is then continued, proceeding with a making a determination in step 724 whether to continue SNA operations. If so, then the process is continued, proceeding with step 704. Otherwise, SNA operations are ended in step 726.

FIG. 8 is a generalized depiction of the effect of an implementation of a social network advocacy (SNA) system on market capitalization value in accordance with an embodiment of the invention. As shown in FIG. 8, a market capitalization scale 802 comprising a plurality of per-share stock values further comprises a current market capitalization value 804 based on a current per-share stock price. It will be appreciated that the current market capitalization value 804 may be positively influenced by cost declines 806 or product improvements 808, such as new features, or negatively influenced by price cuts 810 or reactive competitive actions 812. It will likewise be appreciated that the changes in the current market capitalization value 804 may be correlated to changes in a vendor's, or a vendor's product's, Net Promoter Score (NPS) 814 and its Brand Health Score (BHS) 816. However, these correlations typically happen after the fact and are results-based. In contrast, the positive affect of social net advocacy 818 is realized from proactive efforts resulting from the implementation of a SNA system as described in greater detail herein. As shown in FIG. 8, the positive affect of social net advocacy 818 is increased by facilitating the influence of ravers 820 while mitigating the influence of ranters 822.

Figure 9:
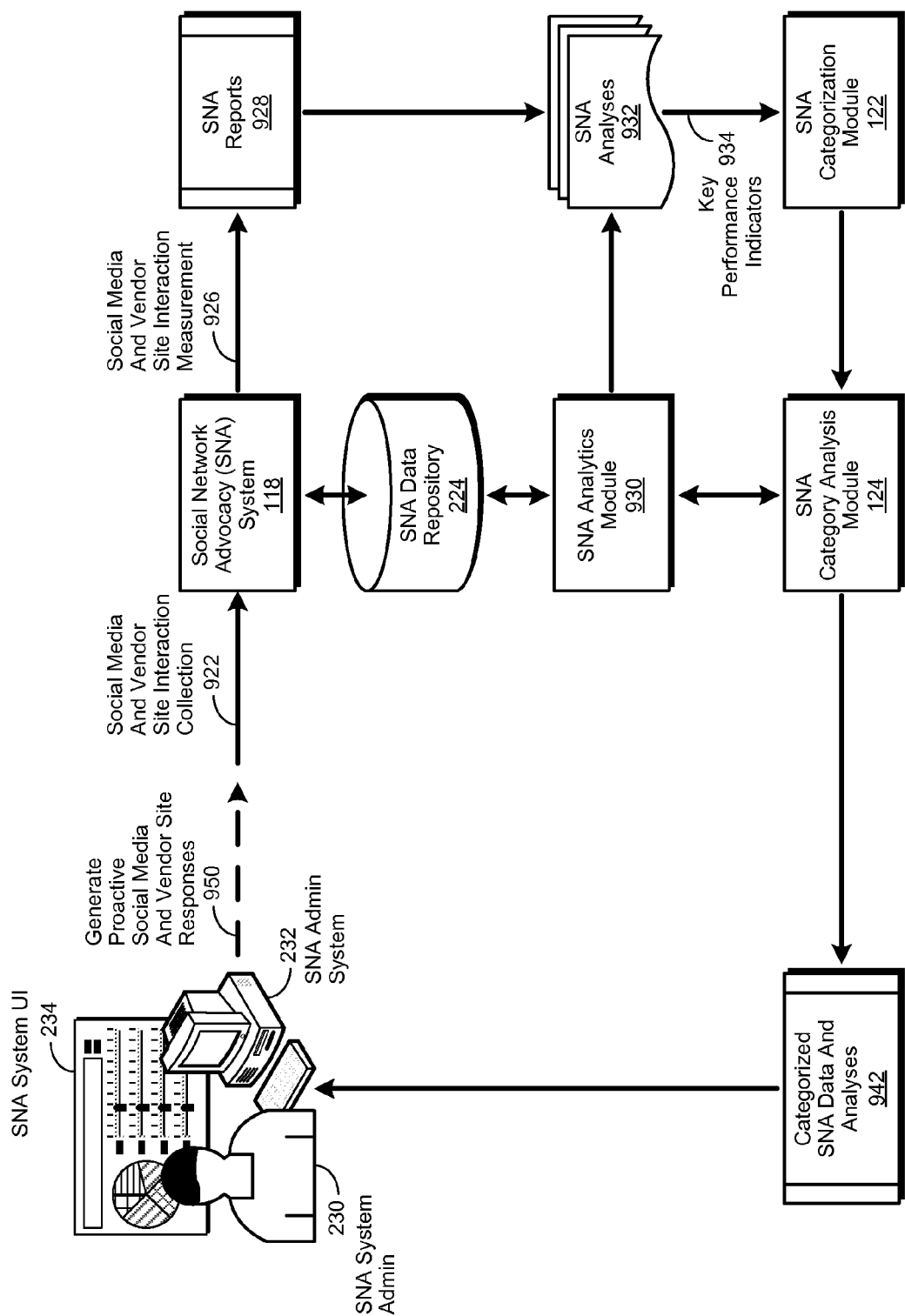
FIG. 9 is a simplified block diagram showing the operation of an SNA system for providing categorical analysis of user interactions within a social media environment and generating proactive responses thereto.

FIG. 9 is a simplified block diagram showing the operation of a social network advocacy (SNA) system as implemented in accordance with an embodiment of the invention for providing categorical analysis of user interactions within a social media environment and generating proactive responses thereto. In this embodiment, various user interactions within one or more social media environments and vendor sites, as described in greater detail herein, are collected and provided 922 to an SNA system 118.

In turn the SNA system 118 accesses SNA data stored in the SNA data repository 224, which is then used to perform SNA operations likewise described in greater detail herein. The SNA operations result in the generation of measurements of user interactions within various social media environments and vendor sites, which are then processed 926 to generate associated SNA reports 928. In this and other embodiments, an SNA analytics module 930 likewise accesses SNA data stored in the SNA data repository 224, which is then used to perform SNA analysis operations. In various embodiments, natural language processing (NLP) approaches familiar to skilled practitioners of the are used to perform the analysis operations. These analysis operations, in combination with SNA reports 928, result in the generation of SNA analyses 932. In one embodiment, the SNA analyses 932 comprise key performance indicators (KPIs) 934. In turn, the SNA analyses 932, and KPIs 934 if included, are used by a SNA topic categorization module 122 to categorize the SNA data into predetermined SNA categories.

As used herein, an SNA category broadly refers to a class, or grouping, of user interactions within a social media environment that share certain properties or characteristics. As such, an SNA category may variously refer to a geography (e.g., "Southwest region"), a market segment (e.g., "consumer"), a group (e.g., a company's field service technicians), an industry (e.g., ""), an object (e.g., a product), a customer, a business function (e.g., customer service), a topic of discussion (e.g., product features and benefits), and so forth. An SNA category may also be a member of a set of SNA categories. As an example, SNA categories "Owning and Using," "Service," "Choose a Product," and "Waiting and Delivery" may all be peer members of an SNA "Customer Journey" group category. Likewise, an SNA category may comprise a set of SNA category subsets. As an example, an SNA "Service" category may comprise "Resolving Query," "Post Purchase," "Service Rep," "Hardware," "WinX Operating System," "Rep," "Guides and Instructions," and "Software-Service" SNA category subsets. To further the example, the SNA category subsets may be topics related to the SNA "Service" category. Skilled practitioners of the art will recognize that many such examples are possible and the foregoing is not intended to limit the spirit, scope or intent of the invention.

Analysis operations are then performed on the resulting categorized SNA data by an SNA topic statistical analysis module 124. In various embodiments, the statistical analysis operations are performed by the SNA topic statistical analysis module 124 interacting with the SNA analytics module 930. In these and other embodiments, an SNA value is generated for each SNA category. In one embodiment, a plurality of SNA category values is processed to generate an aggregate SNA value for the associated SNA categories. In another embodiment, the aggregate SNA value is a simple average of the plurality of SNA category values. In yet another embodiment, the aggregate SNA value is a weighted average of the plurality of SNA category values. In still another embodiment, statistical operations familiar to those of skill in the art are used to generate the aggregate SNA value from the plurality of SNA category values.

In various embodiments, a first set of SNA category values are processed with a second set of SNA category values to generate a set of SNA category variance values, which in turn respectively correspond to the plurality of SNA categories. In this and other embodiments, the first set of SNA category values are associated with a first time interval and the second set of SNA category values are associated with a second time interval. In these various embodiments, the SNA category variance values respectively correspond to the increase or decrease of each SNA category value over a period of time. In various embodiments, a first aggregate SNA value is processed with a second aggregate SNA value to generate an aggregate SNA variance value.

The SNA topic statistical analysis module 124 then provides the categorized SNA data and associated statistical analyses 942 for display within an SNA system user interface (UI) 234 implemented on an SNA administrator system 232. In various embodiments, the categorized SNA data comprises the first set of SNA category values, the second set of SNA category values, the first aggregate SNA category value, the second aggregate SNA category value, the set of SNA category variance values, and the aggregate SNA category variance value. The categorized SNA data and statistical analyses displayed within the SNA system UI 234 are then used by the SNA system administrator 230 to generate 950 proactive marketing responses within one or more social media environments and the vendor's web site.

Figure 10:
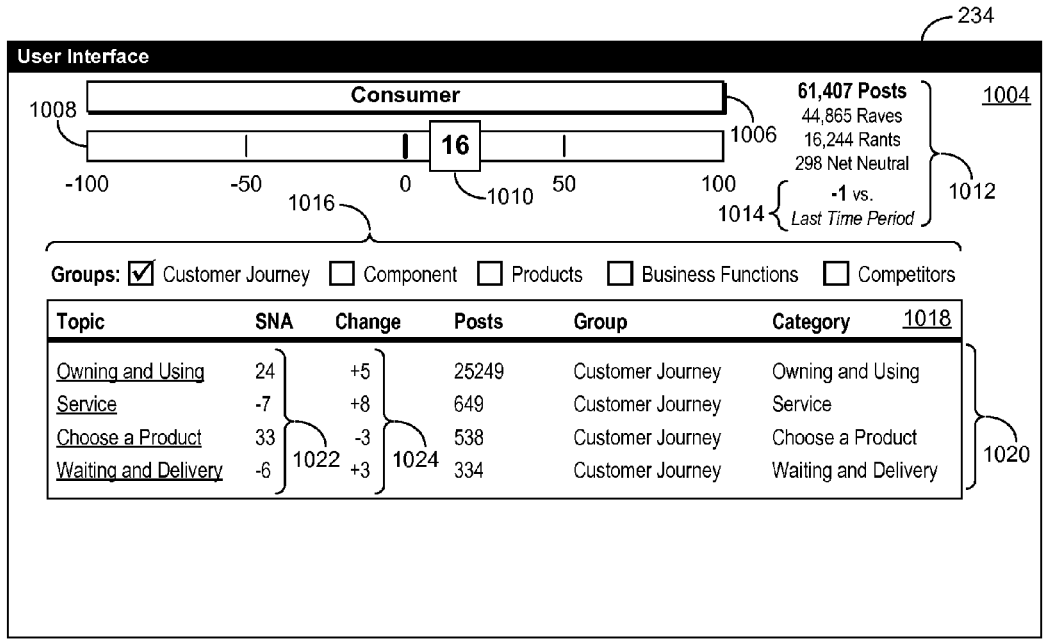
FIG. 10 shows the display of a first level of SNA categorization and analysis data within a user interface.

FIG. 10 shows the display of a first level of social network advocacy (SNA) categorization and analysis data as implemented within a user interface in accordance with an embodiment of the invention. In this embodiment, an SNA user interface (UI) 234 comprises an SNA "Consumer" 1006 category summary window 1004, which in turn comprises an SNA category value scale 1008, an SNA category statistics list 1012, a plurality of SNA category selection boxes 1016, and an SNA sub-category value summary window 1018. As shown in FIG. 10, the "Consumer" 1006 SNA category has a current aggregate SNA category value 1010 of '16' and a current aggregate SNA category variance value 1014 of '−1'. As likewise shown in FIG. 10, the "Customer Journey" category has been selected from the plurality of SNA category selection boxes 1016. As a result, the SNA sub-category value summary window 1018 displays a plurality of SNA topic categories 1020, each of which has a corresponding SNA category value 1022 and an SNA category variance value 1024, as described in greater detail herein.

Figure 11:
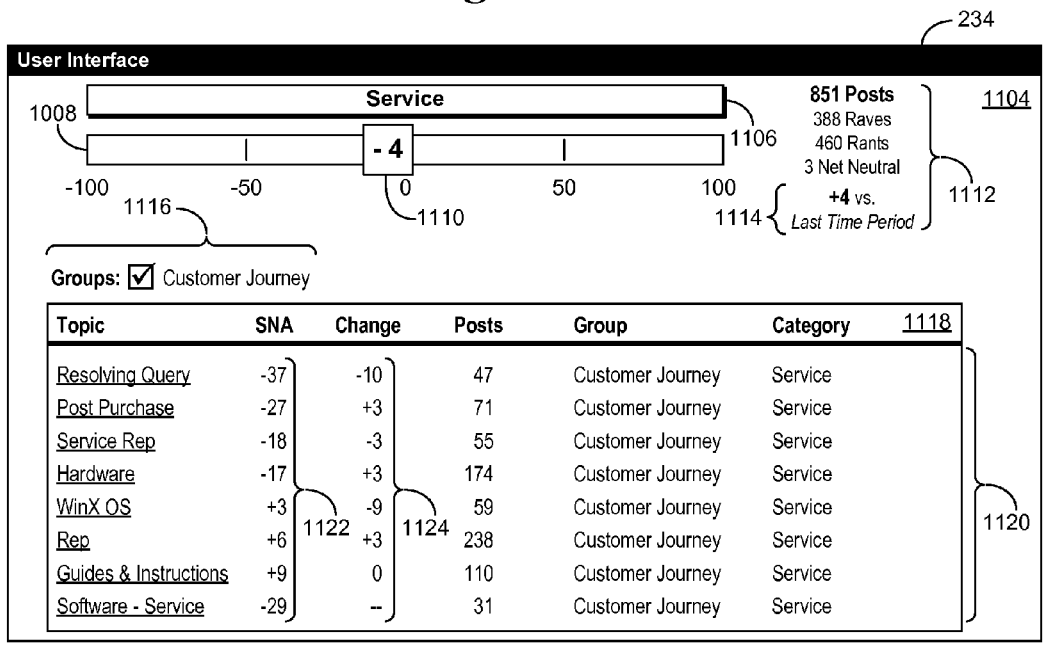
FIG. 11 show the display of a second level of SNA categorization and analysis data within a user interface.

FIG. 11 show the display of a second level of social network advocacy (SNA) categorization and analysis data as implemented within a user interface in accordance with an embodiment of the invention. In this embodiment, an SNA user interface (UI) 234 comprises an SNA "Service" 1106 category detail window 1104, which in turn comprises an SNA category value scale 1008, an SNA sub-category statistics list 1112, a "Customer Journey" selection box 1116 that has been selected from the SNA sub-category value summary window 1018 shown in FIG. 10, and an SNA sub-sub-category value summary window 1018. As shown in FIG. 11, the "Service" 1006 SNA sub-category has a current aggregate SNA category value 1110 of '−4' and a current aggregate SNA category variance value 1114 of '+4'. As likewise shown in FIG. 11, the SNA sub-sub-category value summary window 1118 displays a plurality of SNA topic categories 1120, each of which has a corresponding SNA category value 1122 and an SNA category variance value 1124, as described in greater detail herein.

Figure 12:
FIG. 12 is a simplified block diagram depicting a Social Net Advocacy Pulse (SNAP) process for generating a SNAP metric.

FIG. 12 is a simplified block diagram depicting a Social Net Advocacy Pulse (SNAP) process implemented in accordance with an embodiment of the invention for generating a SNAP metric. As used herein, a SNAP metric broadly refers to a near-real-time measurement of sentiment and advocacy for individual aspects of an organization, such as a business or enterprise. In various embodiments, these real-time measurements are based upon positive, negative and neutral comments made by various social media participants, which are in turn weighted by the respective influence of each author. It will be appreciated that each of these comments has an impact on the perceived favorability, or lack thereof, of the organization's brand.

In this embodiment, social media conversations corresponding to predetermined topics of interest are monitored in block 1202. The monitored conversations are then analyzed in block 1204 to respectively assess each conversations' the top-level of interest, whether pro, con, or indifferent, and assign a value. In various embodiments, natural language processing (NLP) approaches familiar to skilled practitioners of the art used to perform these analysis operations.

Then, in block 1206, the influence level of each author of a social media conversation is determined and respectively assigned a value. The values generated in blocks 1204 and 1206 are then processed in block 1208 to generate an aggregated real-time SNAP metric. Once generated, the SNAP metric, along with various social media conversation sub-categories that can be monitored, analyzed and acted upon, are presented to the user in block 1210.

Figure 13:
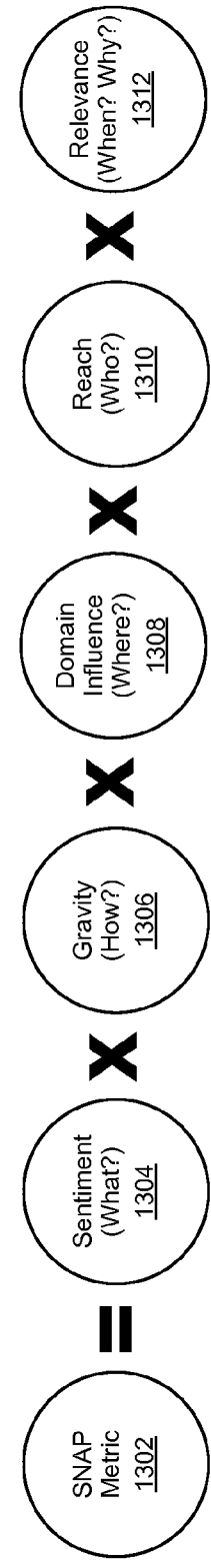
FIG. 13 is a simplified block diagram depicting a SNAP algorithm used to generate a SNAP metric.

FIG. 13 is a simplified block diagram depicting a Social Net Advocacy Pulse (SNAP) algorithm implemented in accordance with an embodiment of the invention for generating a SNAP metric. In various embodiments, the SNAP metric 1302 is generated in near-real-time and is dynamic, based upon the positive, negative and neutral comments of various social media participants, which are in turn weighted by the respective influence of each author. In this embodiment, a value is respectively determined for sentiment 1304, gravity 1306, domain influence 1308, reach 1310, and relevance 1312 factors, which are described in greater detail herein. The SNAP metric 1302 is then generated from the product of the values respectively associated with the sentiment 1304, gravity 1306, domain influence 1308, reach 1310, and relevance 1312 factors.

As used in reference to this and other embodiments, sentiment 1304 is a measure of a social media participant's positive, negative or neutral opinion of a predetermined aspect of an organization, such as a business. For example, these aspects may include a product's features, capabilities and quality, its associated purchase and delivery experience, or subsequent customer service. It will be appreciated that many such aspects are possible and the foregoing are not intended to limit the spirit, scope or intent of the invention. In various embodiments, sentiment 1304 may be measured at the level of a social media conversation, an individual sentence or statement of a social media conversation, or a topic.

As likewise used herein, gravity 1306 refers to the degree of sentiment 1304 expressed by a social media participant. In various embodiments, gravity 1306 is expressed as a value (e.g., −5 to +5) on a numeric scale. As such, a gravity 1306 value can provide differentiation between social media communications such as, "I like my product. It does the job." and "I really like my product and would recommend it to others." As used herein, domain influence 1308 refers to the relative influence of a given social media venue as it relates to a corresponding social media communication, such as a conversation. For example, a comment made on an industry forum would likely have a more significant impact than one made on a personal social media page. Likewise, reach 1310 is used herein to refer to the number and the quality of the followers of the author of a predetermined social media communication.

Relevance 1312 likewise refers to the relevance of the social media communication to the organization, either directly or indirectly. For example, relevance 1312 may determine whether the organization is the primary or secondary topic of the communication. In certain embodiments, relevance 1312 relates to recency, which provides an indication as to whether the communication is related to a recent announcement made by the organization. In one embodiment, relevance 1312 provides an indication of where the author of a social media communication is within a buying cycle of a product. In various embodiments, one or more weighting factors are respectively applied to the values associated with the sentiment 1304, gravity 1306, domain influence 1308, reach 1310, and relevance 1312 factors to generate the SNAP metric 1302. The method of determining the respective weighting factors, and their application, is a matter of design choice and is not intended to limit the spirit, scope or intent of the invention.

Figure 14:
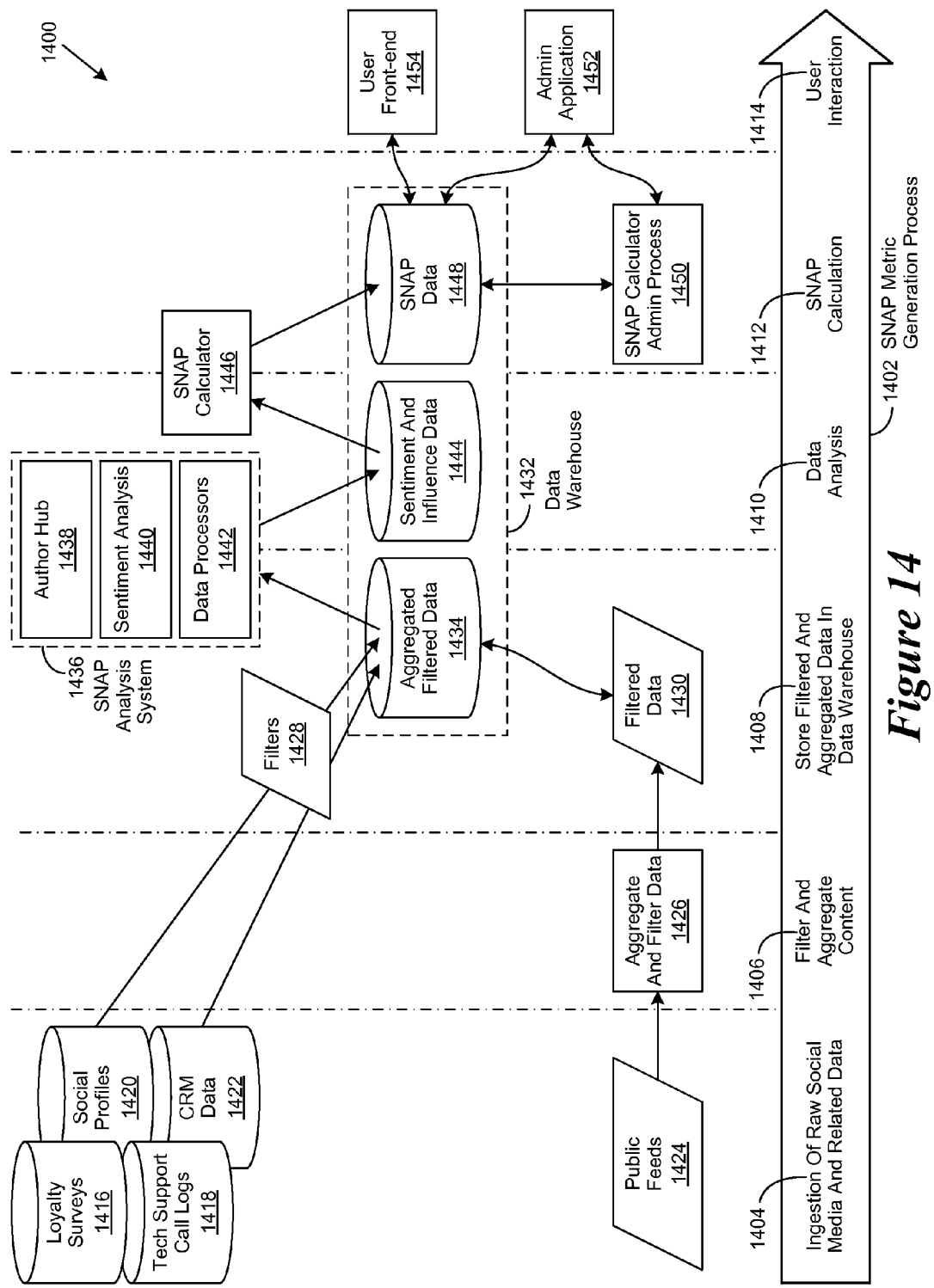
FIG. 14 is a simplified block diagram depicting a SNAP system used to generate a SNAP metric.

FIG. 14 is a simplified block diagram of a Social Net Advocacy Pulse (SNAP) system implemented in accordance with an embodiment of the invention for generating a SNAP metric. In this embodiment, a SNAP system 1400 is implemented in accordance with a SNAP metric generation process 1402. As shown in FIG. 14, the SNAP generation process 1402 includes ingesting raw social media and other related data in ongoing process step 1404. In various embodiments, the ingested data may include data stored in repositories of loyalty survey data 1416, technical support call logs 1418, social media profiles 1420, customer relationship management (CRM) data 1422, as well data acquired from public feeds 1424 from social media environments.

The ingestion of the aforementioned data is then followed by the filtering and aggregation of the ingested data 1426 in ongoing process step 1406, which results in filtered data 1430. Then, in ongoing process step 1408, filters 1428 familiar to those of skill in the art are applied to data provided by the repositories of loyalty survey data 1416, technical support call logs 1418, social media profiles 1420, and CRM data 1422 to generate various sets of filtered data. The resulting filtered and aggregated data is then stored with the filtered data 1430 in a repository of aggregated and filtered data 1434. In various embodiments, the repository of aggregated and filtered data 1434 is part of a data warehouse 1432, familiar to skilled practitioners of the art. In one embodiment, the data warehouse also includes repositories of sentiment and influence data 1444 and SNAP data 1448, which is described in greater detail herein.

Then, in ongoing process step 1410, the filtered and aggregated data 1434 is provided to the SNAP analysis system 1436 for processing to generate sentiment and influence data. In various embodiments, the SNAP analysis system 1436 includes various data processors 1442 familiar to skilled practitioners of the art, as well as a sentiment analysis system 1440 and a social media author hub 1438. In certain embodiments, the social media author hub 1438 correlates sentiment and other data to various social media authors. The resulting sentiment and influence data is then stored in the repository of sentiment and influence data 1444, where it is then provided to a SNAP calculator system 1446 for processing in ongoing process step 1412. The resulting SNAP data generated by the SNAP calculator system 1446 is then stored in the repository of SNAP data 1448.

In various embodiments, the resulting SNAP data is in the form of a SNAP metric, described in greater detail herein. In certain embodiments, a first set of data acquired from public feeds 1424 from social media environments is processed to generate a first SNAP metric and a second set of data acquired from public feeds 1424 from social media environments is processed to generate a second SNAP metric. In these embodiments, the first and second sets of data are respectively associated with a first and second set of user interactions within a social media environment. In various embodiments, the first and second SNAP metrics are then processed to generate SNAP metric differential value, which indicates whether sentiment or advocacy of a target aspect of the organization has improved or declined.

In various embodiments, the resulting SNAP data stored in the repository of SNAP data 1448, and the SNAP calculator system 1446, is administered through the implementation of a predetermined SNAP calculator process 1450, likewise in ongoing process step 1412. The method by which the repository of SNAP data 1448 and the SNAP calculator system 1446 is administered is a matter of design choice. In various embodiments, the repository of SNAP data 1448, and the SNAP calculator administration process 1450, is administered through the use of an administration application 1452 in ongoing process step 1414. Likewise, user interaction with the SNAP system 1400 is provided in ongoing process step 1414 through the implementation of a user front-end 1454. In various embodiments, SNAP metrics, and associated SNAP metric differential values, are presented to the user through the implementation of the user front-end 1454. The method by which user interaction with the SNAP system 1400 is provided through the user front-end 1454 is a matter of design choice.

Figure 15:
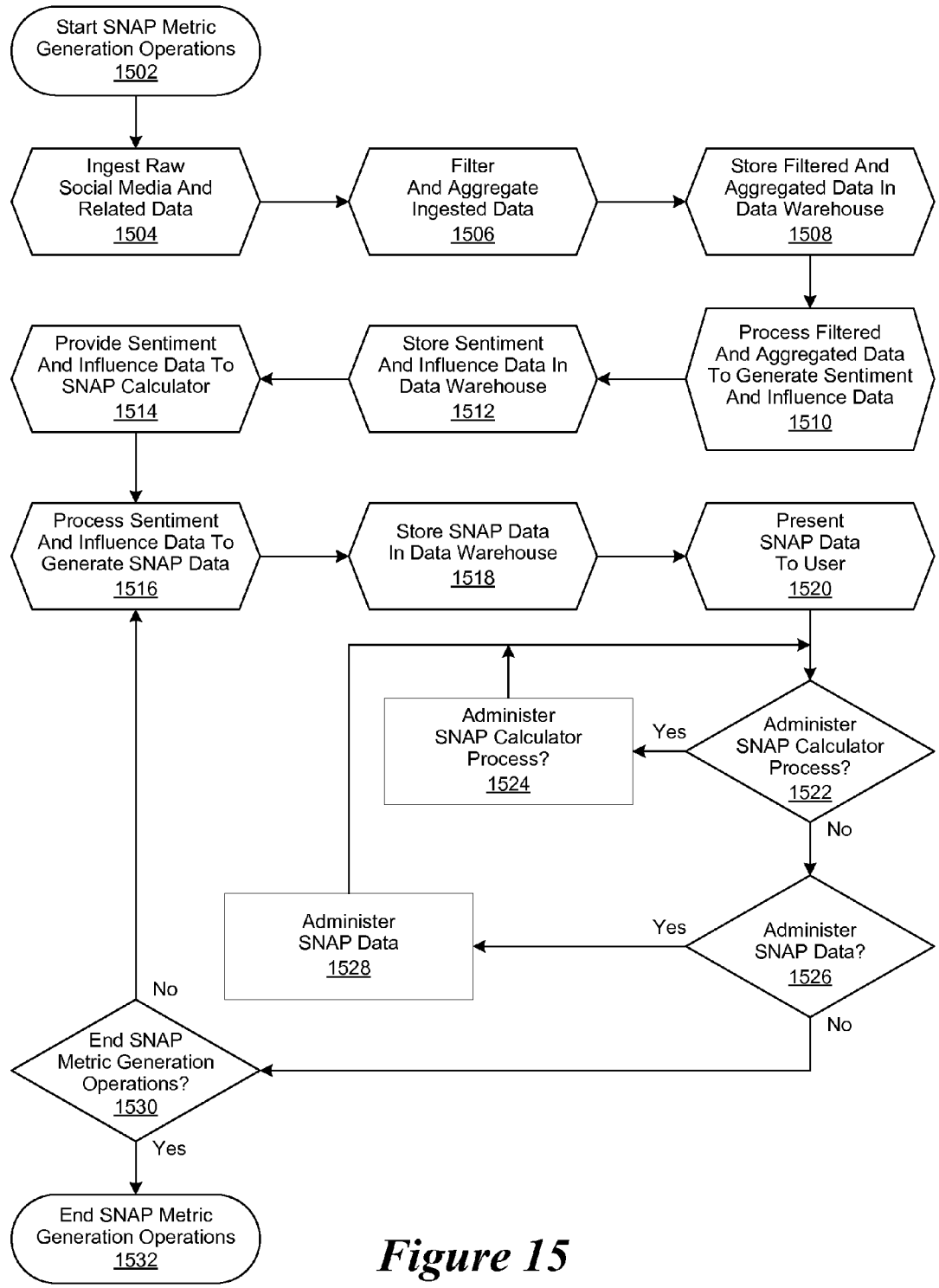
FIG. 15 is a generalized flowchart showing the performance of operations used to generate a SNAP metric.

FIG. 15 is a generalized flowchart showing the performance of operations implemented in accordance with an embodiment of the invention for generating a Social Net Advocacy Pulse (SNAP) metric. In this embodiment, SNAP metric generation operations are begun in step 1502, followed by ingesting raw social media and other related data in ongoing process step 1504. The ingested data is then filtered and aggregated in ongoing process step 1506. The resulting filtered and aggregated data is then stored in a data warehouse in ongoing process step 1508.

Then, in ongoing process step 1510, the filtered and aggregated data is then provided to a SNAP analysis system for processing to generate sentiment and influence data. The resulting sentiment and influence data is then stored in the data warehouse in ongoing process step 1512. Once stored, the sentiment and influence data is provided to a SNAP calculator in ongoing process step 1514, where it is processed to generate SNAP data in step 1516. In turn, the generated SNAP data is then stored in the data warehouse in ongoing process step 1518. Once stored, the SNAP data is made available for presentation to a user in ongoing process step 1520.

A determination is then made in step 1522 whether to administer the process by which the SNAP calculator generates the SNAP data. If so, then the process by which the SNAP calculator generates the SNAP data is administered in step 1524 and the process is continued, proceeding with step 1522. Otherwise, a determination is made in step 1526 whether to administer the SNAP data stored in the data warehouse. If so, then the SNAP data is administered in step 1528 and the process is continued, proceeding with step 1522. Otherwise, a determination is made in step 1530 whether to end SNAP metric generation operations. If not, then the process is continued, proceeding with step 1516. Otherwise SNAP metric generation operations are ended in step 1532.

From the foregoing, it will be appreciated that certain trending indicators, such as Net Promoter Score (NPS), provide an indicator of brand purchase favorability, their accuracy is dependent upon the timing of survey compilation, is limited to existing customers, and is broad-bushed rather than granular. In contrast, SNAP continually assesses the impact of individual social media conversations in near-real-time and monitors how individuals and segments form and change opinions.

Furthermore, unlike typical implementations of trending indicators such as NPS, SNAP is not restricted to existing customers. Instead, it is a more leading and accurate indicator of purchase intent by both existing and prospective customers. Furthermore, various implementations of SNAP recognize that not all promoters and demoters are equal. Instead, each asserts varying influence upon brand perception. Moreover, certain implementations of SNAP are able to glean the reasons for brand favorability, or lack thereof, and provide insights for corrective actions. Additionally, various implementations of SNAP are able to process customer transaction data to assist in determining which features and levels of advocacy have the greatest impact on purchase behavior.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also, for example, while FIGS. 9-11 are directed towards describing analysis of SNA categories and associated topics, other processes and user interfaces which are directed towards describing analysis of SNA media providers, authors and associated posts are also contemplated.

Consequently, the invention is intended to be limited only by the spirit and scope of the appended claims, giving full cognizance to equivalents in all respects.

What is claimed is:

1. A computer-implementable method for providing a near-real-time measurement of sentiment within a social media environment, comprising:

processing a first set of social media data to generate a first set of social network advocacy (SNA) data in near-real-time, the first set of social media data associated with a first set of user interactions within a social media environment, the processing the first set of social media data comprising associating sentiment values for the first set of user interactions;

processing the first set of SNA data to generate a first set of SNA Pulse (SNAP) metric data, the processing the first set of SNA data comprises generating the first set of SNAP metric data using the sentiment values;

processing a second set of social media data to generate a second set of SNA data in near-real-time, the second set of social media data associated with a second set of user interactions within the social media environment, the processing the second set of social media data comprising associating sentiment values for the second set of user interactions;

processing the second set of SNA data to generate a second set of SNAP metric data, the processing the second set of SNA data comprises generating the second set of SNAP metric data using the sentiment values for the second set of user interactions; and processing the first and second sets of SNAP metric data to generate a set of SNAP metrics differential data; and wherein the first and second sets of SNA data respectively comprise a numeric value corresponding to sentiment, a numeric value corresponding to gravity, a numeric value corresponding to domain influence, a numeric value corresponding to reach and a numeric value corresponding to relevance; and, the first and second SNAP metrics are respectively generated by processing at least two of the numeric value corresponding to sentiment, the numeric value corresponding to gravity, the numeric value corresponding to domain influence, the numeric value corresponding to reach and the numeric value corresponding to relevance.

* * * * *